May 31, 1949.                J. A. POTTER                2,471,976
                          VOLTAGE REGULATION
                          Filed April 18, 1946
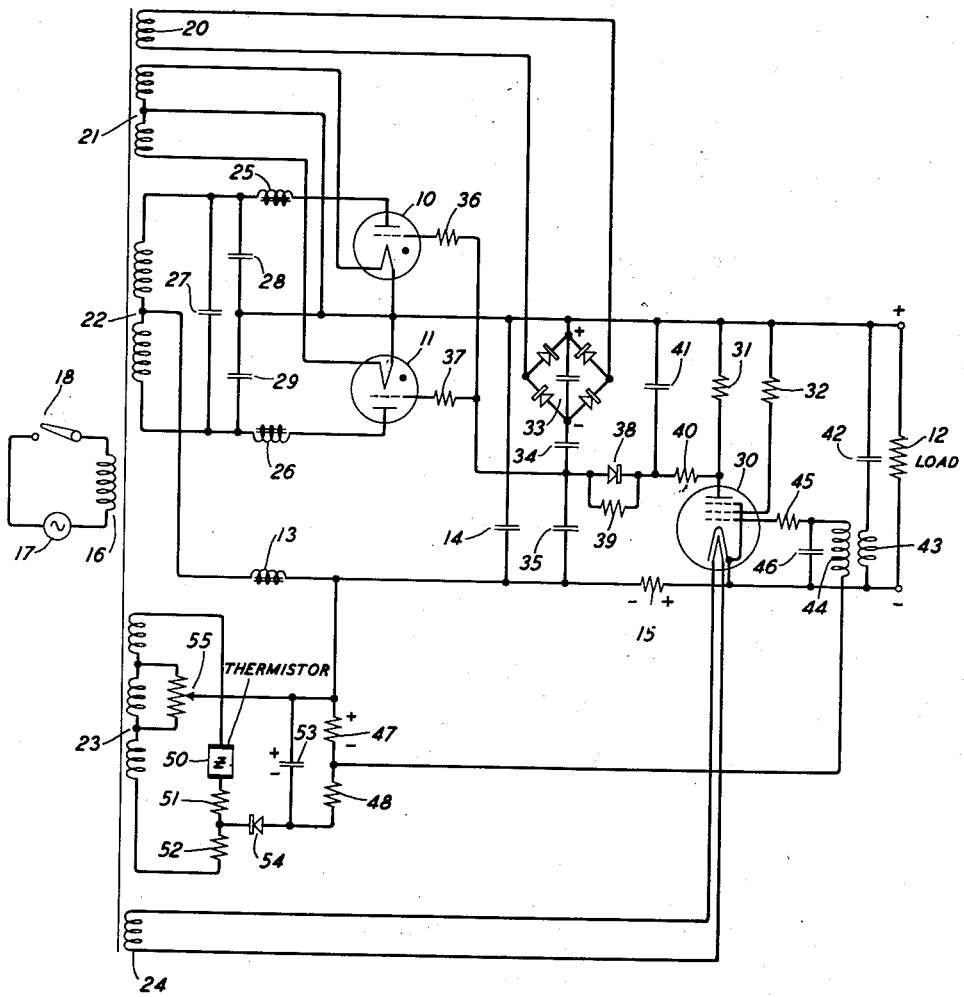
INVENTOR
J. A. POTTER
BY
*G. F. Heuerman*
ATTORNEY Patented May 31, 1949

2,471,976

UNITED STATES PATENT OFFICE 2,471,976

VOLTAGE REGULATION

James A. Potter, Rutherford, N. J., assignor to Bell Telephone Laboratories, Incorporated, New York, N. Y., a corporation of New York Application April 18, 1946, Serial No. 662,956

6 Claims. (Cl. 175—363)

This invention relates to voltage regulation and particularly to a regulated rectifier for supplying rectified current to a load.

An object of the invention is to provide an improved regulated rectifier for supplying rectified current to a load while minimizing load voltage variations.

In a specific embodiment of the invention herein shown and described for the purpose of illustration, there is provided a rectifier employing three electrode space discharge rectifying tubes, preferably of the gas-filled type, for supplying current to a load through an inductance-capacity filter and through a series load compounding resistor one terminal of which is connected to the negative load terminal. The load current may have an average value which varies over a considerable range and also large amplitude changes of signaling frequencies. A shunt current path connected across the load comprises in series a resistor and the space current path of a space current device or shunt regulator tube. There is impressed upon a circuit connecting the control electrode and cathode of the shunt regulator tube a control voltage having three component voltages for controlling the space current in the shunt regulator tube and thereby the voltage drop in the circuit for supplying the rectified current to the load including the drop across the load compounding resistor. One of the component voltages is the voltage drop across the load compounding resistor. As the load increases, for example, the voltage drop across the load compounding resistor increases to make the potential of the control electrode of the shunt regulator tube relatively more negative with respect to the cathode potential to cause a reduction of the space current in the shunt regulator tube and, therefore, to cause the current supplied to the load to increase, thereby tending to prevent a reduction of load voltage due to the increase in load. A second of the component voltages is obtained from an auxiliary rectifier for rectifying current from the alternating current supply source to produce an output voltage which varies inversely with line voltage. When the line voltage increases, for example, the second component voltage makes the control electrode of the shunt regulator tube relatively less negative with respect to the cathode potential to cause the shunt regulator tube to draw more space current, thus minimizing or substantially preventing an increase of current supplied to the load due to the rise of line voltage and thus tending to prevent an increase of load voltage.

The regulated rectifier may be used to supply current to telegraph or other signaling apparatus such that the load current may have large amplitude variations occurring at signaling frequencies in addition to large changes of average current. Load voltage variations due to load changes at relatively high frequencies are effectively suppressed by the inductance-capacity filter. At lower frequencies load compensation is provided by the action of the shunt regulator tube and the regulating voltage component across the load compounding resistor. It was found desirable, however, to provide additional compensation to reduce or eliminate voltage variations within the frequency range from about five cycles to several hundred cycles. Load voltage variations within a frequency range for which additional compensation is desired are, therefore, impressed as the third regulating voltage component upon the control electrode-cathode circuit of the shunt regulating tube. Within this frequency range an increase of load voltage makes the control grid of the shunt regulating tube relatively more positive to cause the space current in the tube to increase and the load current to decrease thus tending to prevent the rise of load voltage. Load voltage variations within this frequency range are thus effectively reduced.

There is provided a circuit for controlling the potential of the control electrode with respect to the cathode potential of each of the space discharge rectifier tubes. For normal operation of the regulated rectifier there is impressed upon the control electrode-cathode circuits of the rectifier tubes a voltage which varies in accordance with changes of average space current in the shunt regulator tube. The average space current of the shunt regulator tube is thus maintained within such limits of its operating range that large transient changes of space current may take place within the operating limits of a particular tube. When the rectifier circuit is started in operation, or when power is restored following a power interruption, the control circuit functions to apply an exponentially decreasing negative biasing potential to the control electrodes of the rectifier tubes thereby preventing the flow of space current in the rectifier tubes while the cathodes are being heated to operating temperature and, thus, preventing damaging the cathodes. For setting up the exponentially changing biasing voltage there is provided an auxiliary rectifier and a condenser in series in the control electrode-cathode circuit of the space discharge tubes of the main rectifier and a high time constant charging circuit for the condenser including the relatively high reverse resistance of an asymmetrically conducting element or varistor of the copper oxide type. When the rectifier tubes are conducting, the condenser may discharge under control of the shunt regulating tube circuit at a relatively rapid rate through a circuit including the relatively low forward resistance of the varistor, current flowing through a circuit including the anode-control grid paths of the rectifier tubes and through the relatively low forward resistance of the varistor.

The single figure of the drawing is a schematic view of a regulated rectifier embodying the invention.

Referring now to the drawing, there is provided a rectifier comprising gas-filled space discharge triodes 10 and 11 for supplying rectified current to a load 12 through a ripple filter having a series inductance element 13 and a 1250-microfarad shunt condenser 14 and through a series load compounding resistor 15. The rectifier tubes 10 and 11 may be of the Western Electric Company, Incorporated, 394A type, for example. There is provided a transformer having a primary winding 16 to which alternating current from a source 17 is supplied when switch 18 is closed and having secondary windings 21, 22, 23 and 24. Winding 21 supplies heating current to the cathodes of tubes 10 and 11, a mid-tap of the winding and the cathodes being connected to the positive load terminal. One end terminal of winding 22 is connected through an inductance element 25 to the anode of tube 10 and the other end terminal of winding 22 is connected through an inductance element 26 to the anode of tube 11. A mid-terminal of winding 22 is connected through an inductance element 13 and through resistor 15 to the negative load terminal. A 2-microfarad condenser 27 is connected across secondary winding 22. Condensers 28 and 29, each of 0.01 microfarad, are connected in series across the winding 22, a common terminal of the condensers being connected to the mid-tap of winding 21 and to the tube cathodes.

A shunt regulator tube 30 which may be of the RCA 6Y6 type has its space current path connected in a shunt path across the load, the cathode of the tube being connected to the negative load terminal and the anode being connected through a 150-ohm resistor 31 to the positive load terminal. The screen grid of the shunt regulator tube is connected through a 100-ohm resistor 32 to the positive load terminal. Current is supplied to the cathode heater of tube 30 from transformer winding 24. There is provided a current path comprising in series an auxiliary rectifier 33 of the varistor bridge type, the positive output terminal of which is connected to the positive load terminal, a 4-microfarad condenser 34 and a 4-microfarad condenser 35, one terminal of which is connected to the common terminal of inductance element 13 and of resistor 15. A common terminal of condensers 34 and 35 is connected to the control grid of tube 10 through 22,000-ohm resistor 36 and to the control grid of tube 11 through 22,000-ohm resistor 37. The common terminal of condensers 34 and 35 is connected through an asymmetrically conducting element or varistor 38 of the copper oxide type, shunted by a 3-megohm resistor 39 and a 15,000-ohm resistor 40 in series therewith to the anode of tube 30. Varistors are described in an article by J. A. Becker on page 322 et seq. of "Bell Laboratories Record" for July 1940. The common terminal of varistor 38, resistor 39 and resistor 40 is connected through a 4-microfarad condenser 41 to the positive load terminal. There is connected across the load a current path comprising in series a 4-microfarad condenser 42, one terminal of which is connected to the positive load terminal and the primary winding 43 of a transformer having a secondary winding 44, the transformer having a voltage step-up ratio to give a secondary voltage of 10 to 100 times the primary voltage. One terminal of the winding 44 is connected through a 100,000-ohm resistor 45 to the control grid tube 30, the common terminal of winding 44 and resistor 45 being connected through a condenser 46 to the cathode of tube 30.

A circuit connecting the control electrode and cathode of tube 30 may be traced from the control electrode through resistor 45, transformer winding 44, resistor 47 of 100,000 ohms and through load compounding resistor 15 to the cathode. A unidirectional voltage which varies inversely with the voltage of source 17 is set up across the resistor 47 by a circuit arrangement described as follows:

The end terminals of transformer winding 23, across which an electromotive force of about 345 volts appears, are connected to a circuit comprising in series a thermistor 50, an ambient temperature compensating resistor 51 and a 12,000-ohm resistor 52. A thermistor is a resistance element made from a class of materials known as semi-conductors which have a large negative temperature coefficient of resistance. Thermistors are described in an article by G. L. Pearson in "Bell Laboratories Record" for December 1940, page 106 et seq. A 5,000-ohm potentiometer 55 is connected across a portion of transformer winding 23 across which an electromotive force of about 17 volts is set up. The electromotive force appearing across the portion of transformer winding 23 which connects a terminal of thermistor 50 with an end terminal of potentiometer 55 is about 20 volts. The adjustable tap of potentiometer 55 is connected to one plate of a 0.5-microfarad condenser 53. The other plate of condenser 53 is connected through an asymmetrical varistor or rectifying element 54 to a common terminal of resistors 51 and 52. The condenser 53 is shunted by a path comprising in series resistor 47 and a 47,000-ohm resistor 48. The condenser is thus charged by current flowing in a circuit which may be traced from the variable tap of potentiometer 52 to the positively charged plate of condenser 53 and from the negatively charged condenser plate through varistor 54 and resistor 52 to an end terminal of transformer 23. If the line voltage increases, for example, the current through the circuit, comprising thermistor 50 and resistors 51 and 52 in series, increases to cause the resistance of thermistor 50 to decrease. As a result the voltage across resistor 52 increases by a greater percentage than the percentage increase of the voltage across transformer winding 23. The voltage available for charging condenser 53 is thus reduced with the result that the voltage to which the condenser is charged and the voltage drop across resistor 47 each decreases. When the voltage of the supply source increases, for example, the rate of decrease of voltage across resistor 47 is greater than the rate of increase of the supply voltage.

It will be apparent, therefore, that when the line voltage increases, for example, with the result that the voltage drop across resistor 47 decreases, the control grid of tube 30 will become relatively less negative with respect to the cathode potential to cause the space current in tube 30 to increase, thus tending to prevent an increase of current flowing through the load 12. An increase of load voltage due to the increased line voltage is thus minimized or substantially prevented. So also, if the load is increased, the voltage drop across resistor 15 increases to make the control grid of shunt regulator tube more negative with respect to its cathode, thereby reducing the space current in the tube and causing the current through the load to increase. The reduction of load voltage due to the increase of load is thus minimized or substantially prevented.

Load voltage compensation is provided not only for average changes of load but also for load changes occurring at signaling frequencies such as those due to the production of telegraph signals and audio frequency signals present in the load. The time constant of the circuit including filter condenser 14 and the load is sufficiently large that the load voltage does not change to any appreciable extent over the short period of a wave of a relatively high frequency. At lower frequencies, when the load is decreased, for example, to make the control grid of tube 30 less negative due to the decreased voltage drop across resistor 15, the space current in tube 30 increases to cause a reduction of current through the load. This action, therefore, tends to prevent a rise of load voltage due to the decrease in load. It was found, however, that additional compensation was required to reduce load voltage variations over a frequency range from about five to several hundred cycles. For this purpose alternating components of the load voltage are impressed upon the control grid-cathode circuit of shunt regulator tube 30 through a coupling circuit comprising condenser 42, transformer 43, 44 and condenser 46. Within the specified frequency range, when the load voltage is increased, there is induced in winding 44 of the transformer a voltage of such polarity as to make the grid of the shunt regulator tube relatively less negative with respect to the cathode, thereby causing the space current in tube 30 to increase and the voltage drop across resistor 15 and other resistance in series with the load to increase. Changes of load voltage are thus minimized. The condenser 46 is provided for causing 120-cycle feedback voltage components to be attenuated more than the lower frequency components, say in the range of 5 to 50 cycles, thus making the circuit less effective in suppressing the 120-cycle ripple frequency. This is done because in a particular use of the circuit the 120-cycle load voltage variations were larger than other frequency components so that the tube 30 would be overloaded by the 120-cycle component if it were not first reduced in amplitude. A shunt regulator tube of larger capacity than the tube 30 could of course be used in which case the condenser 46 could be omitted. However, in the application of the invention for which the circuit was particularly designed the suppression of the 120-cycle voltage component was found to be less important than the voltage regulation in the frequency range from 0 to 50 or 60 cycles.

In starting the operation of the regulated rectifying circuit in response to closure of switch 18 heating current is supplied to the cathodes of tubes 10 and 11 from transformer winding 21, heating current is supplied to the cathode heater of tube 30 from transformer winding 24, current is supplied to the circuit connected to winding 23 and current is supplied from winding 20 to auxiliary rectifier 33. In order to avoid damaging the cathodes of tubes 10 and 11 while the cathodes are being heated to operating temperature, there is impressed upon the control electrodes with respect to the cathodes a negative biasing potential for preventing the flow of space current in the tubes, this biasing potential decreasing exponentially until a potential is reached at which conduction in tubes 10 and 11 is initiated. The action of the circuit arrangement for setting up this biasing potential will now be described.

When current is first supplied to the auxiliary rectifier 33 the control grids of tubes 10 and 11 are made about 30 volts negative due to the output voltage of rectifier 33. Current from this auxiliary rectifier quickly charges condensers 14, 35 and 34 in series at which time the negative biasing voltage is 15 volts, that is, the output voltage of auxiliary rectifier 33 minus the voltage to which the condenser 34 is charged. Condenser 34 continues to charge but at a relatively slow rate through a circuit comprising in series rectifier 33, condenser 41, the relatively high reverse resistance of varistor 38, shunted by resistor 39, and condenser 34. While condenser 34 is being charged, condenser 35 discharges through condensers 14 and 41 and varistor 38 shunted by resistor 39. When the biasing voltage has decreased sufficiently, tubes 10 and 11 become conducting, respectively, during alternate half cycles of the current from source 17. Rectified current is thus applied to the load circuit to set up a voltage across condenser 14 and across the load. The polarity of the voltage across condenser 35 now reverses, this condenser being charged by grid current, that is, current flowing in a circuit including the space between the anode and control grid of the rectifier tube which is conducting, resistor 36 or resistor 37, condenser 35, a portion of transformer winding 22 and inductance element 25 or 26. Grid current may also flow through a circuit comprising condenser 34, auxiliary rectifier 33 and condenser 14 to further charge condenser 34 to cause the voltage in the control grid-cathode circuits of tubes 10 and 11 to change in a direction such as to cause the tubes to start conducting earlier in each positive half-cycle of the anode voltage and thus cause the load voltage to gradually increase. Due to the voltage to which condenser 35 is charged by grid current of tubes 10 and 11, current flows in a shunt path across condenser 35 comprising in series varistor 38, resistor 40, the space current path of tube 30 and resistor 15. At this time, therefore, the varistor 38 has a relatively low resistance so that the small voltage drop across the varistor has a negligible effect upon the control electrode-cathode circuit of tubes 10 and 11.

It is desired to limit the changes of average space current in shunt regulator tube 30 so that large amplitude, short duration increases or decreases of space current may take place for effecting regulation of the load voltage. The average voltage across resistor 31 is, therefore, impressed upon the control grid-cathode circuits of tubes 10 and 11, alternating components of the voltage drop across resistor 31 being attenuated by the filtering action of resistor 40 and condenser 41. One terminal of condenser 41 is connected to the cathodes of tubes 10 and 11 and its other terminal is connected through the relatively low forward resistance of varistor 38 and through resistor 36 to the control grid of tube 10 and through resistor 37 to the control grid of tube 11. As explained above, if the load is decreased or if the line voltage increases the load voltage tends to rise, but this rise in load voltage is minimized or substantially prevented by causing the control electrode of tube 30 to be made relatively less negative with respect to the cathode and thus causing the space current in tube 30 to rise. An increase in average space current in tube 30, however, results in an increase of the charge on condenser 41 and, therefore, in the grids of tubes 10 and 11 being made relatively more negative. The resulting decrease in average rectifier output voltage across condenser 14 tends to prevent a further rise of space current in the shunt regulator tube. It is apparent that the average space current in shunt regulator tube 30 will have an upper limiting value for the condition of minimum load and maximum line voltage and a lower limiting value for the condition of maximum load and minimum line voltage. The circuit is so designed that the space current in shunt regulator tube 30 may vary above or below either of these limiting values of average space current by a sufficient amplitude to cause load voltage changes due to relatively brief fluctuations in line voltage and load to be minimized. It should be noted that as soon as the voltage across condenser 14 rises, for example, due either to an increase of line voltage or to a decrease in load, the charge on condenser 35 is increased and that across condenser 34 is decreased, thereby making the control grids of rectifier tubes 10 and 11 relatively more negative with respect to the cathodes and thus bringing the rectifier output voltage across condenser 14 back to its previous value. A hunting action which might otherwise take place due to the delay in the application of a voltage change occurring across resistor 31 to the control electrode-cathode circuits of rectifier tubes 10 and 11 is thus avoided.

What is claimed is:

1. A rectifier for supplying rectified current to a load comprising a space discharge device having an anode, a cathode and a control electrode, a first circuit connecting said anode and said cathode including a source of alternating current and said load, a shunt path across which the output voltage of said rectifier is impressed when rectified current is supplied to said load, a second circuit connecting said control electrode and said cathode comprising a condenser, means for charging said condenser for setting up an exponentially changing voltage in said second circuit for preventing the flow of space current during an initial period while the cathode of said device is being heated to operating temperature and for causing space current to flow through said device to said load subsequent to said initial period, and means effective subsequent to said initial period for causing the charge on said condenser to change for controlling the potential of said control electrode with respect to the potential of said cathode, said means comprising means having a time constant which is low with respect to the time constant of said means for charging said condenser during said initial period.

2. The combination with a rectifier for rectifying current from an alternating current supply source and a circuit for supplying said rectified current to the load of a shunt current path connected across said load comprising the space current path of a space current device, said space current device having a control means upon which a control voltage may be impressed for controlling the space current in said device, a resistor in series in said circuit through which flow the load current and the current in said shunt path, and means for setting up a control voltage having a plurality of components for controlling the current in said space current device to minimize voltage changes across said load, said last-mentioned means comprising said resistor across which a first of said component voltages is set up, means energized by current from said supply source for setting up a second component voltage, said second component voltage being a unidirectional voltage which decreases in response to an increase of supply voltage and vice versa, and means for deriving an alternating voltage from said load voltage to set up said third control voltage component, an increase of said first component voltage or of said second component voltage causing the current in said space current device to decrease and vice versa, and an increase of said third component voltage due to an increasing load voltage causing the current in said space current device to increase.

3. In combination, means for rectifying current from an alternating current supply source and for supplying the rectified current to a load through a circuit comprising a resistor in series with the load, one terminal of said resistor being connected to the negative load terminal, a space discharge device having an anode, a cathode and a control electrode, means for connecting said cathode to the negative load terminal, means for connecting said anode to the positive load terminal, a transformer having a primary and a secondary winding, a current path connected across said load comprising said primary transformer winding, a circuit connecting said control electrode and said cathode comprising in series said secondary transformer winding and said resistor, means energized by current from said alternating current source for setting up a unidirectional voltage having variations corresponding to supply voltage variations, and means for impressing said voltage upon said control electrode-cathode circuit.

4. Means for minimizing voltage variations across a load to which direct current is supplied from a rectifier of current from an alternating current supply source, a first resistor in series with said load through which flows the direct current supplied to said load, one terminal of said first resistor being connected to the negative terminal of said load, a first shunt current path across said load comprising a space current device having an anode, a cathode and a control electrode, said cathode being connected to said negative load terminal, means energized by current from said alternating current supply source for setting up across a second resistor a unidirectional voltage which decreases in response to a voltage increase of said supply source and vice versa, a transformer having a primary and a secondary winding, a second shunt current path connected across said load comprising the primary winding of said transformer, and a circuit connecting said control electrode and said cathode of said space current device comprising in series said first and second resistors and the secondary winding of said transformer, the unidirectional voltages across said first and second resistors being in aiding relationship and of such polarity as to make the potential of the control electrode negative with respect to the cathode potential, the phase of the alternating voltage set up across said secondary transformer winding being such as to make the control electrode relatively less negative with respect to the cathode potential when the load voltage is increasing, and vice versa.

5. In combination, a space current device having an anode, a cathode and a control electrode, means for supplying space current to said device from an alternating current supply source when said device is conducting, means for supplying heating current to said cathode from said supply source, a rectifier to which the supply of energizing current from said supply source is initiated simultaneously with the starting of the supply of heating current to said cathode, means for connecting the positive output terminal of said rectifier to said cathode, a condenser having one of its terminals connected to the negative output terminal of said rectifier, means for connecting the other terminal of said condenser to said control electrode, an asymmetrically conducting device, and a charging circuit for said condenser comprising said asymmetrically conducting device, charging current for said condenser flowing through said asymmetrically conducting device in its reverse or high resistance direction thereby delaying the starting of conduction of space current in said space current device during a period in which said condenser is being charged.

6. In combination, a main rectifier including a space current device having an anode, a cathode and a control electrode for rectifying current from an alternating current supply source and for supplying the rectified current to a load, a filter condenser in a first path connected across the output of said main rectifier, an auxiliary rectifier energized by current from said alternating current supply source, a second current path connected across the output terminals of said main rectifier comprising in series said auxiliary rectifier and a second and a third condenser, the positive output terminal of said auxiliary rectifier being connected to the cathode of said space current device, means for connecting the common terminal of said second and third condensers to said control electrode to control the bias thereof with respect to the cathode potential, a shunt path connected across said load comprising in series a first resistor and the space current path of a second space current device, said second space current device having an anode connected to a terminal of said resistor and a cathode connected to the negative load terminal, means for controlling the impedance of said second space current device for regulating the load voltage, a current path connecting the anode of said second space current device and the common terminal of said second and third condensers comprising in series a second resistor, one terminal of which is connected to said anode and an asymmetrically conducting device, a fourth condenser in a path connecting the positive load terminal and a common terminal of said asymmetrically conducting device and said second resistor, said second and fourth condensers being charged by current from said auxiliary rectifier through a circuit including the reverse or relatively high resistance of said asymmetrically conducting device to set up an exponentially changing voltage for biasing the control electrode with respect to the cathode of said first space current device to delay conduction therein, the control electrode-cathode potential of said first space current device being controlled subsequent to initiation of conduction therein in accordance with changes of average space current in said second space current device to limit the changes of average space current in said second space current device.

JAMES A. POTTER.

REFERENCES CITED

The following references are of record in the file of this patent:

UNITED STATES PATENTS

| Number | Name | Date |
|---|---|---|
| 1,832,646 | Miessner | Nov. 17, 1931 |
| 2,341,013 | Black | Feb. 8, 1944 |
| 2,372,432 | Keizer | Mar. 27, 1945 |
| 2,391,801 | Schade | Dec. 25, 1945 |